United States Patent [19]

Augustin

[11] Patent Number: 5,215,052
[45] Date of Patent: Jun. 1, 1993

[54] INTERNAL-COMBUSTION ENGINE WITH PREDOMINANTLY SWIRL-FREE AIR INFLOW INTO A SHALLOW COMBUSTION SPACE

[75] Inventor: Ulrich Augustin, Kernen, Fed. Rep. of Germany

[73] Assignee: Mercedes-Benz AG, Fed. Rep. of Germany

[21] Appl. No.: 925,255

[22] Filed: Aug. 6, 1992

[30] Foreign Application Priority Data

Aug. 21, 1991 [DE] Fed. Rep. of Germany ....... 4127617

[51] Int. Cl.⁵ .............................................. F02F 3/26
[52] U.S. Cl. .................................... 123/276; 123/285
[58] Field of Search ............... 123/276, 279, 281, 282, 123/285, 294, 659, 193.6

[56] References Cited

U.S. PATENT DOCUMENTS

| 2,254,438 | 9/1941 | McCarthy | 123/285 |
| 2,573,536 | 10/1951 | Bodine, Jr. | 123/285 |
| 2,738,781 | 3/1956 | Bodine, Jr. | 123/285 |
| 5,029,563 | 7/1991 | Hu | 123/276 |

FOREIGN PATENT DOCUMENTS

| 516370 | 1/1953 | Belgium | 123/276 |
| 655093 | 12/1937 | Fed. Rep. of Germany | 123/276 |
| 815580 | 7/1949 | Fed. Rep. of Germany | 123/276 |
| 1476075 | 10/1963 | Fed. Rep. of Germany | 123/276 |
| 3742574 | 2/1989 | Fed. Rep. of Germany | 123/276 |
| 783669 | 7/1935 | France | 123/276 |
| 893051 | 5/1944 | France | 123/276 |
| 897171 | 3/1945 | France | 123/276 |
| 1104319 | 11/1955 | France | 123/276 |
| 1373853 | 11/1964 | France | 123/276 |
| 174163 | 3/1935 | Switzerland | 123/276 |
| 216497 | 12/1941 | Switzerland | 123/276 |
| 570968 | 7/1945 | United Kingdom | 123/276 |

Primary Examiner—Raymond A. Nelli
Attorney, Agent, or Firm—Evenson, McKeown, Edwards & Lenahan

[57] ABSTRACT

An internal-combustion engine has predominantly swirl-free air inflow into a shallow combustion space. A centrally arranged injection nozzle with preferably eight spray holes projects into the combustion space. The nozzle has a piston with a piston recess. Depressions are formed in the recess bottom of the piston recess and correspond to the number of injection jets. The depressions extend from the center of the piston in the direction of the injection jets, are matched to the jet shape and have a corrugated shape in the circumferential direction of the piston recess.

7 Claims, 1 Drawing Sheet

INTERNAL-COMBUSTION ENGINE WITH PREDOMINANTLY SWIRL-FREE AIR INFLOW INTO A SHALLOW COMBUSTION SPACE

BACKGROUND AND SUMMARY OF THE INVENTION

The present invention relates to an internal-combustion engine with predominantly swirl-free air inflow into a shallow combustion space, and, more particularly, to a combustion engine having a centrally arranged injection nozzle with a plurality of spray holes and depressions formed in the piston corresponding to the number of injection jets.

Swiss Patent No. 216,497 discloses a shallow combustion space between the cylinder head and the piston. The piston head is provided with radially extending depressions or recesses for the injection jets of a centrally arranged multi-hole nozzle. The depressions starting from the center of the piston head lead as far as the wall of the recess. Therefore, any wetting of the cylinder wall with the fuel is avoided. The edges of these depressions are made ridge-shaped and therefore impede the expansion of the ignited air/fuel mixture in the circumferential direction of the combustion space.

German Auslegeschrift No. 1,476,075 discloses a piston head having formed-in depressions which extend in the direction of the fuel jets of a centrally arranged multi-hole nozzle into the vicinity of the piston edge and run with relatively flat transition radii into the piston head. However, plane portions are located on the piston head between the depressions. This arrangement is unfavorable in terms of flow.

An object on which the present invention is based is to provide on an internal-combustion engine in which further improvements are attainable in the mixture formation during combustion processes with predominant air distribution, while, in particular, the expansion of the ignited mixture in the circumferential direction of the combustion space is to take place without flow losses.

The foregoing object has been achieved in accordance with the present invention by providing the piston with a shallow piston recess, and depressions are formed in the recess bottom so that they have a corrugated shape in relation to the circumferential direction of the piston recess.

As a result of the unique streamlined contour of the piston recess, the edge zones of the injection jets are at a greater distance from the cylinder head and from the depressions in the recess bottom. Settlement of fuel is thereby avoided, as is settlement of fuel on the cylinder wall and in the piston-ring region. The corrugated shape of the recess bottom ensures low flow losses and prevents flow breakaways.

BRIEF DESCRIPTION OF THE DRAWINGS

These and further objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
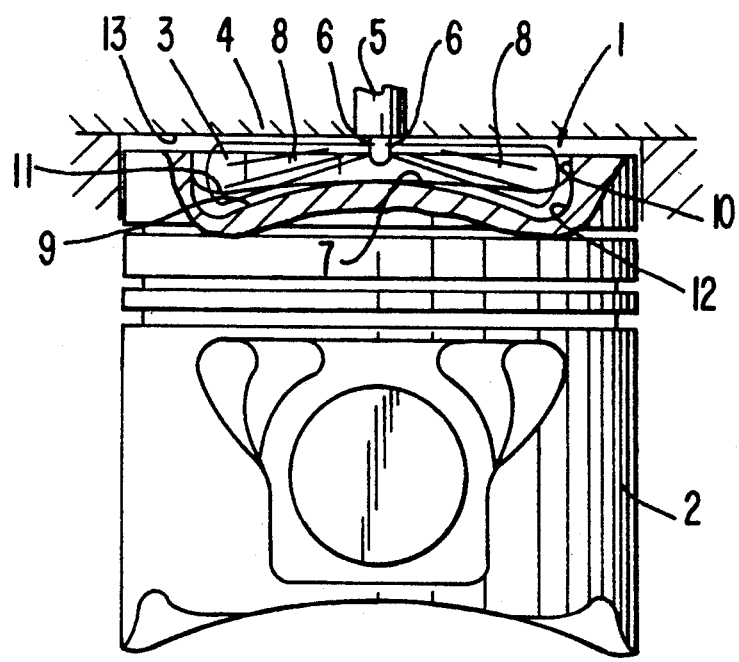
FIG. 1 is a partial cross-sectional, elevation view of a piston with piston recess in accordance with the present invention.
Figure 2:
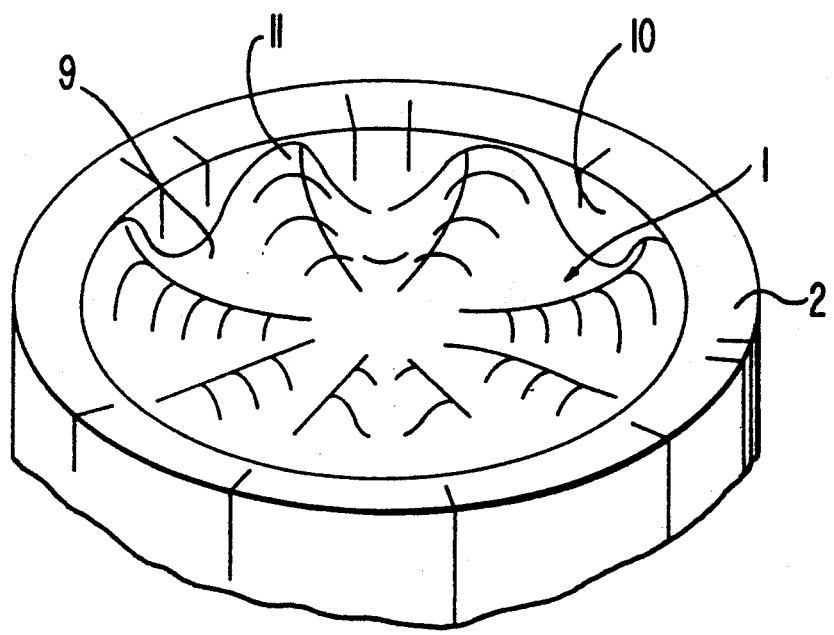
FIG. 2 is a perspective view of the upper region of the piston with piston recess shown in FIG. 1.

An internal-combustion engine (shown schematically) with predominantly swirl-free air inflow into the shallow combustion space 1 has a piston 2 with a circular piston recess 3 coaxial with the piston 2. A multi-hole nozzle 5 located centrally opposite the piston recess 3 and having eight spray holes 6 is arranged in the cylinder head 4 of the internal-combustion engine.

The piston recess 3 forming the combustion space 1 has depressions 9, in the recess bottom 7 which depressions correspond to the number of injection jets 8 from the nozzle 5 and which extend from the center of the piston recess 3 as far as the cylindrical recess wall 10, widening and deepening continuously. The depressions 9 are matched to the jet shape of the injection jets as seen in FIG. 1). The formed-in depressions 9 are configured so that the contour of the recess bottom has a sinusoidal or corrugated shape, as seen in the circumferential direction. Consequently, there is a depression 9 for each injection jet 8, and an elevated portion 11 is present between the injection jets 8. A soft transition without sharp edges is provided between the depression 9 and the elevation or elevated portions 11 shaped like a wave trough and wave crest. The transition 12 between the recess bottom 7 and the cylindrical recess wall 10 is also made arcuate, again as seen in FIG. 1.

A preferred configuration of the piston 2 is obtained if the diameter $M_D$ of the piston recess 3 is 70–80% of the diameter $K_D$ of the piston 2 and if the piston recess 3 has a central recess depth $M_m$ of 5–10% of the piston diameter $K_D$. The recess depth $M_T$ between the piston-recess edge 14 and the greatest depression 9 being between 13 and 21%, and the recess depth $M_B$ between the piston-recess edge 14 and the greatest elevation 11 being between 2 and 14% of the piston diameter $K_D$.

The transition 12 between the recess bottom 7 and the cylindrical recess wall 10 is formed by a radius R which corresponds to between 4 and 12% of the piston diameter $K_D$.

The small depth of the piston recess 3 and the plane limiting face 13 on the cylinder head provide a shallow combustion-space shape which prevents settlement of fuel on the piston head and on the cylinder head 4 by virtue of the formed-in depressions 9 in the recess bottom 7.

As a result of the unique recess contour, the recess surface is enlarged and, with the same wall temperature, ensures a lower combustion temperature, with reduced $NO_X$ emissions. After the ignition of the air/fuel mixtures first prepared, a microflow takes place in the direction of the regions not yet in combustion. The corrugated shape of the depressions 9 ensures low flow losses.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An internal-combustion engine with predominantly swirl-free air inflow into a shallow combustion space, comprising a piston, a centrally arranged injection nozzle with a plurality of spray holes, and depressions formed in the piston and corresponding to the number of injection jets and which, starting from a central portion of the piston, extend in a direction of injection jets from the nozzle and are substantially matched to a shape of the jets, wherein the piston has a shallow piston recess, and the depressions are formed in a bottom of the recess such that the depressions have a corrugated shape circumferentially of the piston recess.

2. The internal-combustion engine according to claim 1, wherein the depressions in the recess bottom extend in the direction of the injection jets, widening and deepening continuously to match the shape of the injection jets, as far as a wall of the piston recess.

3. The internal-combustion engine according to claim 1, wherein a transition between the recess bottom and the recess wall is arcuate and circumferentially corrugated.

4. The internal-combustion engine according to claim 3, wherein the depressions in the recess bottom extend in the direction of the injection jets, widening and deepening continuously to match the shape of the injection jets, as far as a wall of the piston recess.

5. The internal-combustion engine according to claim 1, wherein the number of injection jets is between five and eight.

6. The internal-combustion engine according to claim 5, wherein the depressions in the recess bottom extend in the direction of the injection jets, widening and deepening continuously to match the shape of the injection jets, as far as a wall of the piston recess.

7. The internal-combustion engine according to claim 6, wherein a transition between the recess bottom and the recess wall is arcuate and circumferentially corrugated.

* * * * *